United States Patent [19]
Eastham

[11] 3,746,899
[45] July 17, 1973

[54] LINEAR INDUCTION MOTOR PRIMARY MEMBER

[75] Inventor: John Frederick Eastham, Long Ditton, Surrey, England

[73] Assignee: Tracked Hovercraft Limited, London, England

[22] Filed: Apr. 19, 1972

[21] Appl. No.: 245,517

[30] Foreign Application Priority Data
Apr. 29, 1971 Great Britain.................. 12,226/71

[52] U.S. Cl............................. 310/12, 104/148 LM
[51] Int. Cl. ............................................. H02k 41/04
[58] Field of Search ................. 310/12, 13, 14, 198, 310/202, 203, 204, 205, 206, 207; 318/135; 104/148 LM

[56] References Cited
UNITED STATES PATENTS
1,950,627  3/1934  Parvin............................... 310/13 X
3,497,730  2/1970  Doolittle............................. 310/13
3,585,423  6/1971  Bolton ............................... 310/13

Primary Examiner—J. D. Miller
Assistant Examiner—H. Huberfeld
Attorney—Cameron, Kerkam, Sutton, Stowell & Stowell

[57] ABSTRACT

A primary member in or for a linear induction motor of a kind in which at least part of the working flux passes generally transversely of the motor; the primary member has a magnetic core structure terminating in at least two transversely spaced ends, and a two-layer energising winding of which the winding conductors extend generally transversely of the primary member to pass adjacent the ends of the core structure. The winding conductors are angled where they cross the gaps between the ends so that in operation the travelling magnetic fields produced by the energising winding at the two ends are substantially in antiphase with one another.

12 Claims, 12 Drawing Figures

Patented July 17, 1973 3,746,899

LINEAR INDUCTION MOTOR PRIMARY MEMBER

This invention relates to primary members for polyphase, especially three-phase, linear induction motors.

A polyphase linear induction motor comprises a primary member and a secondary member arranged transversely of one another for relative longitudinal movement therebetween. The primary member carries a polyphase energising winding and the primary and secondary members are arranged and relatively disposed so that there are provided low reluctance paths which magnetically link the primary and secondary members. In operation flux driven around these magnetic paths by the energising winding induces currents in electrically conductive material forming at least part of the secondary member; these currents in turn react with the flux to create longitudinally directed propulsive force between the primary and secondary members. For brevity such flux is hereinafter to be referred to as "working flux."

As has been described and claimed in U. S. Pat. Nos. 3,585,423 and 3,628,072 and the related co-pending application Ser. No. 241,069 which is a continuation of Ser. No. 73,107, now abandoned, to which patents and application the reader's attention is drawn for further information, at least part of the working flux may pass through the primary-secondary magnetic circuit in low reluctance paths which are orientated transversely of the motor.

FIG. 6 of the above mentioned application Ser. No. 241,069 shows an arrangement in which working flux is driven around transverse low reluctance paths by two windings each wound on a respective magnetic lamination stack. The stacks extend in parallel relationship to one another with a gap therebetween, the two energising windings being disposed side-by-side with their innermost winding noses adjacent one another and accommodated by the gap between the stacks.

The present invention stems from the realisation that the need for the adjacent winding noses can be avoided if the two windings are combined. (It will be appreciated, however, that the invention is in no way limited to an improvement of this particular linear induction motor primary member.)

According to one aspect of the present invention in a linear induction motor primary member having a magnetic core structure adapted for enabling working flux in operation to pass generally transversely of the motor around a primary-secondary magnetic circuit, the core structure is terminated magnetically in the primary-secondary magnetic circuit at transversely spaced ends, the primary member having, for creating the said working flux, a polyphase energising winding comprising a plurality of winding conductors arranged in at least one winding layer, each winding conductor extending generally transversely of the motor in a respective said winding layer and having a first part disposed adjacent one said end of the core structure for generating working flux therein and having a second part spaced from the first part and disposed adjacent the other said end of the core structure for generating working flux therein, and energising means for so energising the winding conductors from the phases of a polyphase A.C. supply that in operation the first and second parts of the conductors separately create fields of magneto-motive force which travel longitudinally of the primary member at the same speed as one another and which are at least substantially in antiphase transversely of the primary member.

Preferably the said ends of the core structure are castellated to provide core teeth longitudinally spaced apart with winding slots therebetween. In the winding slots are received the first and second parts of the winding conductors.

The primary member may be adapted for providing part of a single primary-secondary magnetic circuit across the width of the motor, or it may be adapted for providing part of two (or more) such magnetic circuits side-by-side.

According to a preferred feature of the invention the winding conductors are arranged in two winding layers, the winding conductors of each winding layer having at least one of their ends connected to respective winding conductors of the other winding layer.

Preferably the interconnection and energisation of the conductors is such that, in operation, current equality exists generally transversely of the motor as between the winding layers, so that the current in each first conductor part is equal (and opposite) to the current in a generally transversely disposed second conductor part in the other winding layer. Alternatively, however, the interconnection and energisation of the conductors may be such that current equality exists generally transversely of the motor within each winding layer considered separately.

The winding conductors may be such that the windings which they form (and which collectively constitute the energising windings) are wave windings, or lap windings, or looped windings with splayed-apart terminations. The windings may have only one turn or they may be multiturn.

Preferably the winding conductors of the two winding layers are generally identical, when in position the winding conductors of the two winding layers being inverted as between the winding layers.

Advantageously the energising winding is formed by a method which comprises preforming the winding conductors, placing winding conductors in position to form the first winding layer with their first and second parts received at the bottom of the winding slots, similarly forming the second winding layer from further winding conductors, and then making the interconnections between the winding conductors of the two winding layers.

According to a further aspect of the present invention there is provided a linear induction motor including a primary member as defined above.

A particular application of the present invention is for vehicle propulsion in ground transportation systems, in which vehicles (e.g., gas cushion vehicles) are propelled along prepared tracks. In such an application of the invention the primary member is usually vehicle-mounted and the co-operating secondary member is elongate and extends along the track; the reverse arrangement is, however, possible.

These and other aspects and features of the invention will now become apparent from the following description given, by way of example and with reference to the accompanying diagrammatic drawings, of four embodiments of the invention and various modifications thereof. In the drawings:

FIG. 4 shows one of the windings forming the energising winding and itself formed of two of the conductors of FIG. 2, FIG. 5 corresponds to FIG. 1 in relation to the second embodiment, FIG. 6 corresponds to FIG. 2 in relation to the second embodiment, FIG. 7 corresponds to FIG. 3 in relation to the third embodiment, FIG. 8 corresponds to FIG. 2 in relation to the third embodiment, FIG. 9 corresponds to FIG. 2 in relation to the fourth embodiment.

Although not apparent from the drawings, in each of the described embodiments the primary member is mounted generally horizontally on a vehicle arranged for operation along a prepared track. The co-operating secondary member is elongate and extends along the track vertically beneath the primary member in spaced relation thereto.

Referring now to FIGS. 1 to 4, the first motor has its primary member 1 and secondary member 2 spaced apart for relative movement in the direction of the arrow A.

Figure 1:
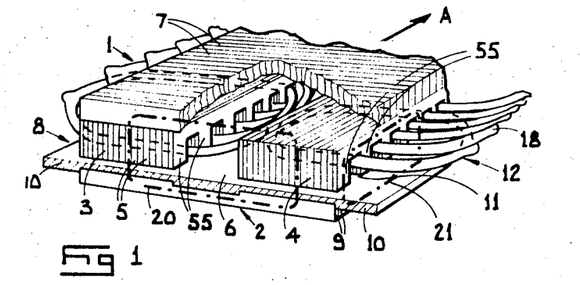
FIG. 1 is a perspective view of part of a linear induction motor of which the primary member forms the first embodiment, the primary member being partly cut away to show its interior.

The primary member 1 comprises two horizontally disposed stacks 3, 4 of longitudinally orientated vertical magnetic laminations 5. The stacks 3, 4 are of like rectangular cross-section and extend continuously along the primary member in parallel relation with a gap 6 therebetween.

Disposed above the stacks 3, 4 and extending between their outermost edges are further magnetic laminations 7. The laminations 7 are rectangular and extend continuously along the primary member; individually they lie in vertical planes directed transversely of the motor.

The secondary member 2 comprises a reaction member 8 of aluminium or other electrically conductive material and, on the side of the member 8 remote from the primary member, magnetic backing material formed of transversely orientated vertical magnetic laminations 9. The laminations 9 and the reaction member 8 both extend continuously along the secondary member.

Transversely of the motor the laminations 9 are generally U-shaped. They are so disposed and dimensioned that the ends of their arms face towards the under surfaces of the stacks 3, 4 and correspond laterally thereto.

The reaction member 8 extends across the width of the motor and projects beyond the magnetic material of the primary and secondary members at overhanging portions 10. The reaction member has a plane upper surface but has a thickness which is greater beneath the slot 6 and at the overhanging portions 10 than beneath the stacks 3, 4.

Returning again to the primary member 1, the undersides of the stacks 3, 4 are formed regularly with core teeth 55 spaced apart by transverse winding slots 11. Each slot 11 is aligned transversely of the motor with a slot 11 from the other stack 3 or 4. The slots 11 in combination receive the winding conductors of a three-phase two-layer distributed winding 12 of which the arrangement will become apparent from its method of formation now to be described with reference to FIGS. 2 to 4.

Figure 2:
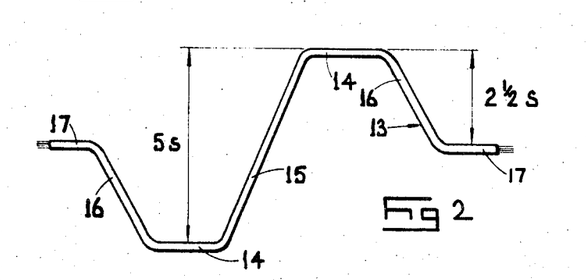
FIG. 2 shows one of the winding conductors forming the polyphase energising winding of the primary member of FIG. 1, FIG. 3 schematically illustrates in underside plan view the arrangement of the energising winding.

The winding 12 is made up from identical, insulated winding conductors 13 which may or may not be of a stranded conductor construction as shown and which are preformed generally in the form of an S, as is shown in FIG. 2 which shows one such conductor.

Each conductor 13 is generally planar and has two straight and offset but parallel portions 14 joined by an inclined crossover portion 15. Beyond the portions 14 the conductor has two further portions 16 which are inclined oppositely to the crossover portion 15 and lead to conductor end portions 17 which are aligned with one another and with the centre of the crossover portion 15.

The amount by which the parallel portions 14 are offset from one another corresponds to five slot pitches of the slots 11. In addition, the separation of the portions 14 in their longitudinal direction is slightly smaller than the width of the gap 6, and the length of each portion 14 is slightly greater than the width of each stack 3, 4. Each conductor 13, either as shown in FIG. 2 or upside down, can therefore be positioned on the primary member magnetic material with its portions 14 received in winding slots 11 of the stacks 3, 4, which are offset by five slot pitches.

In order to form the winding 12, identically arranged conductors 13 are presented to the primary member magnetic material, one over each winding slot 11, and then pushed to the bottom of the slots to form the winding layer which will be remote from the secondary member 2 in operation. The conductors 13 forming this winding layer are indicated in FIG. 3 by the broken lines.

The second winding layer is then formed in a similar way, but with conductors 13 which are upside down in relation to those of the first layer. The conductors 13 of this second layer are indicated in FIG. 3 by the full lines.

Figure 3:
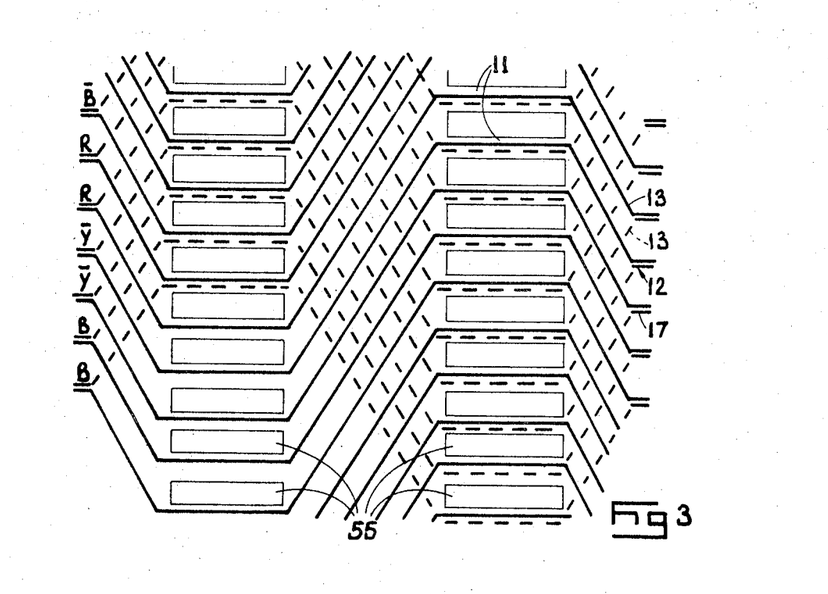

Along the righthand side of the primary member (as seen in FIG. 3) the ends of the winding conductors of one winding layer are connected to the respective adjacent ends of the winding conductors of the other layer, to form winding noses as indicated in FIG. 1 by the reference numeral 18. These winding noses lie generally in planes which are orthogonal to the winding layers, and it may be necessary or desirable to form the conductors 13 initially with the bends required for the winding noses.

Figure 4:
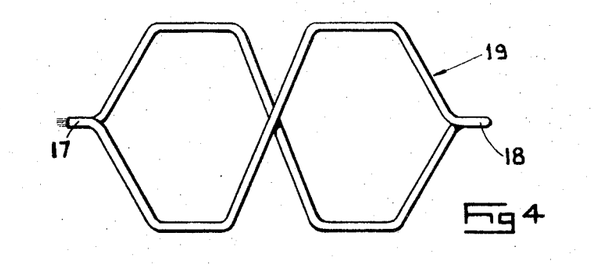

The connections made at the winding noses 18 form the conductors 13 into separate but overlapping windings each generally in the form of a figure of eight. These windings, of which one is shown in FIG. 4 and indicated by the reference numeral 19, are thereafter connected at their lefthand ends to the phases of a three-phase A.C. supply with the pairs of terminal ends of successive windings 19 connected to the red (R), yellow (Y) and blue (B) phases of the supply in the following cyclical order: R, R, $\overline{Y}$, $\overline{Y}$, B, B, $\overline{R}$, $\overline{R}$, Y, Y, $\overline{B}$, $\overline{B}$, R, etc., the bars above the phase letters denoting that the connection to the appropriate phase of the supply is reversed.

It will also be appreciated that at some stage after the winding conductors 13 have been placed in position they will be secured in the winding slots 11 by, for example, slots wedges and/or a thermosetting resin.

In operation, when the primary member is disposed in spaced relation to the secondary member as shown in FIG. 1, the energisation of the windings 19 as described above causes each stack 3, 4 to generate, in known manner, a resultant field of magnetomotive which travels longitudinally of the primary member; the resultant fields produced by the two stacks travel in the same direction and at equal speeds dependent upon the pitch of the slots 11 and the frequency of the A.C. supply.

The pitching of the winding conductors in each of the two layers and the offsetting of the conductors between the stacks is such that the two currents flowing in each winding slot are equal and opposite to respective ones of the two currents flowing in the corresponding, i.e., transversely aligned, winding slot. Thus the resultant travelling magnetomotive forces produced by the stacks 3, 4 are antiphase, and these two fields additively combine to drive flux around parallel and transversely orientated low reluctance paths comprising in series, the laminations of the stack 3, the transverse laminations 7, the laminations 5 of the stack 4, and then the laminations 9 of the secondary member and back to the primary member at the laminations of the stack 3.

As is illustrated in FIG. 1 by the broken line 20, flux passing in these transverse magnetic paths passes twice through the reaction member 8, once beneath the stack 3 and once beneath the stack 4. In so doing it induces in the reaction member currents which flow in generally rectangular paths corresponding to the magnetic poles set up by each stack. In known manner, the parts of the currents beneath the stacks 3 and 4, orientated generally transversely of the motor, react with the flux to produce propulsive force in the direction of the arrow A in FIG. 1.

The thickened part of the reaction plate, i.e., at the overhanging portions 10 and beneath the slots 6, provides low resistance paths for the longitudinally extending parts of the secondary member current paths, so that current flow in the reaction member 8 beneath the stacks 3 and 4 can be substantially transverse of the motor and therefore fully effective to produce propulsive force.

In addition to the flux paths as described above, some working flux associated with each stack 3, 4 separately will also pass longitudinally of the motor in flux paths provided in part by the laminations 5 in their longitudinal direction. One such flux path is indicated in FIG. 1 by the broken line 21. The parts of the laminations 5 bridging the winding slots 11 are dimensioned to saturate at a low level of flux and, in addition, the longitudinal flux paths are transverse to the laminations 9 and therefore of relatively high A.C. reluctance, that is to say, the reluctance taking into account the effects of eddy currents associated with the paths; the contribution of the flux passing in these longitudinally directed paths to the total propulsive force will therefore be small. One of the many reasons for providing the longitudinal laminations 5 is to enable the winding slots 11 easily to be made partially closed and to give the primary member mechanical strength in the longitudinal direction.

In the embodiment of FIGS. 1 to 4 the windings 19 span five slot pitches in each stack 3, 4 and are so energised that for each stack the travelling fields separately produced by the two winding layers are displaced from one another by 30° (elect); in non-illustrated modifications of the first embodiment the windings 19 span four, six, seven and eight slot pitches so that, with the same energisation of the windings as previously described, the phase displacement is respectively 60° (elect) in the same sense as the first embodiment, zero, and 30° (elect) and 60° (elect) in the opposite sense.

A feature of the arrangement of FIGS. 1 to 4 and of the non-illustrated modifications of the last paragraph is that in aligned winding slots the directly antiphase currents occur in different winding layers. However, current equality in aligned winding slots can, if desired, be provided in the same winding layer, but this not only requires the crossover portions 15 of the winding conductors to span a whole pole pitch of the applied electrical supply, but also unless in each winding slot the currents in the two conductors are the same (i.e., zero phase displacement), it also requires different lengths for the further portions 16 along the two sides of the motor.

In a modification of such an arrangement only one of the layers of winding conductors is provided, the other layer being omitted. The winding conductors forming the single winding layer remaining are suitably connected to the energising A.C. supply.

Thus transverse current equality in the winding layers taken separately will normally require conductors with relatively long crossover portions 15 and unequal further portions 16. Generally speaking, therefore, transverse current equality as between winding layers will be preferred.

In one possible arrangement having transverse current equality in the winding layers taken separately and having the energisation previously described, each component winding (such as the winding 19 of FIG. 4) has one loop spanning five slot pitches and the other loop spanning seven slot pitches. This gives a phase displacement of 30° (elect) between the two currents in each winding slot. Likewise, for a 60° (elect) phase displacement one loop spans four slot pitches and the other loop eight.

Figure 5:
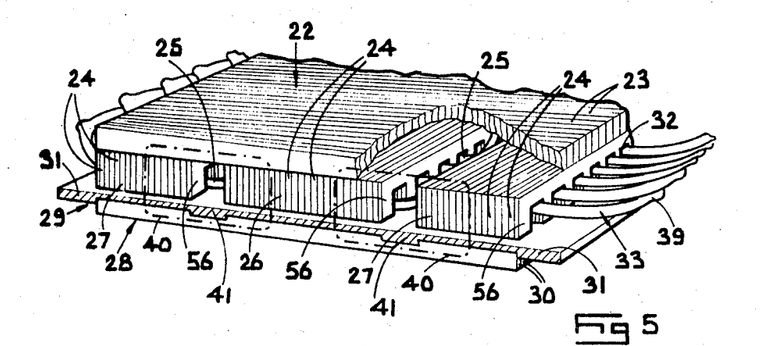
Figure 6:
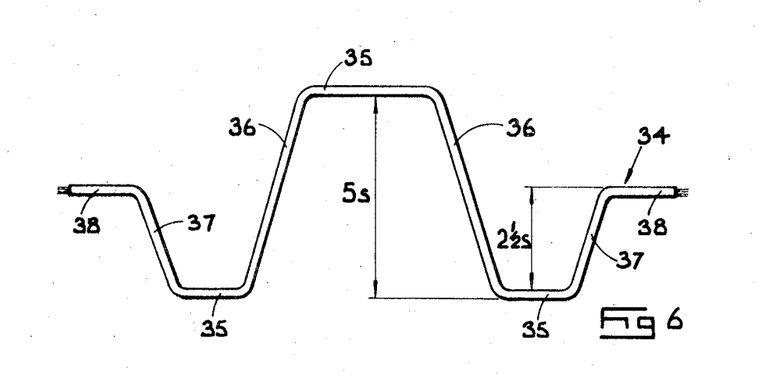

In the arrangement of FIGS. 1 to 4 and the modifications thereof only one transverse low reluctance path for working flux is provided across the width of the motor; however, it will be appreciated that a primary member in accordance with the invention may have two or more transverse low reluctance paths provided across its width, and FIGS. 5 and 6 show a further embodiment in which two low reluctance paths are provided side-by-side.

Referring now to FIG. 5, the primary member 22 of the second embodiment comprises transversely orientated magnetic laminations 23 backing three stacks of longitudinal laminations 24 spaced apart by longitudinal gaps 25, the centre stack 26 being approximately twice as wide as the outer stacks 27.

The secondary member 28 comprises a reaction member 29 which is backed by generally W-shaped transverse laminations 30 and is thickened at overhanging portions 31 and at the portions 41 beneath the gaps 25.

At their undersurfaces the stacks 26, 27 are regularly formed with core teeth 56 spaced apart by transversely aligned winding slots 32. In the slots 32 is located a double layer, distributed, three-phase A.C. winding 33.

The winding 33 is made up from generally planar winding conductors 34 (see FIG. 6) by exactly the same method of assembly as previously described in relation to the first embodiment. In FIG. 6 portions of the winding conductors 34 which are received in the winding slots 32 are indicated by the reference numeral 35, the crossover portions bridging the winding slots by the reference numeral 36, the inclined portions flanking the outer ones of the portions 35 by the reference numeral 37, and the conductor end portions by the reference numeral 38.

In a corresponding way to the first embodiment, the offsetting of the central portion 35 of each winding conductor from the outer portions 35 thereof is by five slot pitches, and the terminal ends 38 are co-linear with the centres of the crossover portions 36.

For operation the individual windings formed by the interconnection of the winding conductors 34 at the winding noses 39 are connected to the phases of a three-phase A.C. supply as previously described in relation to the first embodiment, and it will be appreciated that, because the resultant travelling fields produced by the outer stacks 27 are in phase with one another and in antiphase to the resultant field produced by the centre stack 26, working flux will pass transversely of the motor in side-by-side pairs of flux paths as is illustrated in FIG. 5 by the broken lines 40.

It will also be appreciated that, as in the first embodiment, a small amount of longitudinally directed flux will be associated with each stack 26, 27 separately.

The embodiment of FIGS. 5 and 6 can be considered to be formed of two of the motors of FIGS. 1 to 4 arranged side-by-side with the adjacent parts of their transverse magnetic paths provided in common by the centre stack 26, and further non-illustrated embodiments are formed by the analogous combination of pairs of motors of the described modifications of the first embodiment.

Although the invention has so far been described in relation to what may be considered to be lap windings, i.e., windings which are almost closed, other types of winding may also be used. One such arrangement, illustrated in FIGS. 7 and 8, is a wave-wound version of the first embodiment, being identical to it in all but the arrangements of the three-phase winding.

Figure 7:
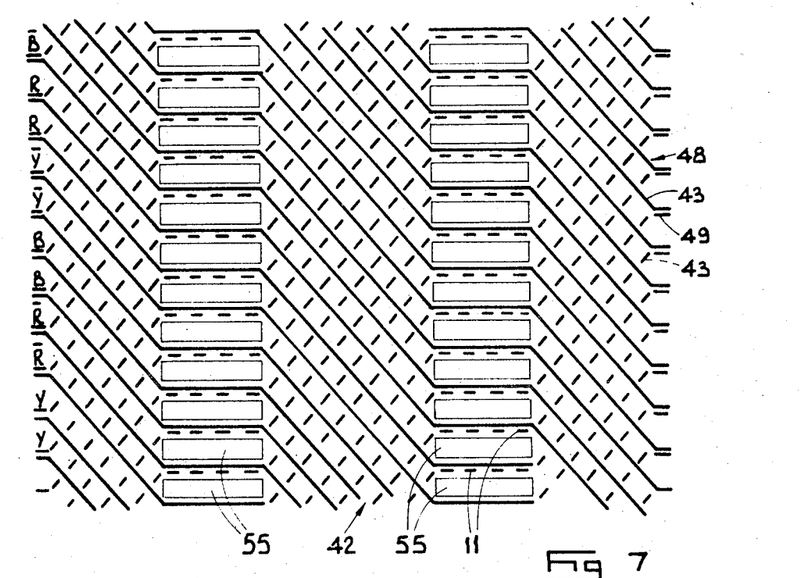
Figure 8:
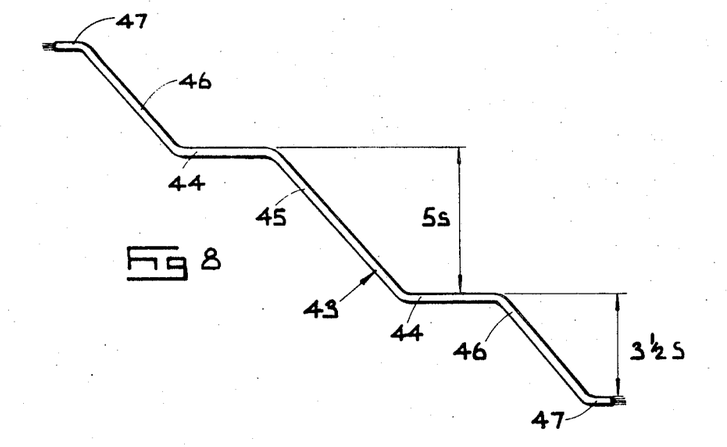

Referring now to FIGS. 7 and 8, the three-phase winding 42 of this third embodiment is made up from generally planar winding conductors 43 of which one is shown in FIG. 8. Like the winding conductors 13 of the first embodiment, each conductor 43 has two straight and offset but parallel portions 44 joined by an inclined crossover portion 45 and flanked by further inclined portions 46 extending to the conductor end portions 47. Whereas in the first embodiment the portions 16 are oppositely inclined to the crossover portions 15, in this third embodiment the portions 45 and 46 have the same direction of inclination.

In each conductor 43 the offsetting of the portions 44 corresponds to five slot pitches of the winding slots 11, and the length and inclination of the further portions 46 is such that the conductor end portions 47 are offset by three and a half slot pitches from the adjacent ones of the portions 44.

The method of assembly of the conductors 43 to form the three-phase winding 42 is the same as the formation of the windings of the previous two embodiments and results in separate but overlapping wave windings 48 having winding noses 49 at their right hand sides. The connection of these wave windings 48 for energisation from a three-phase supply is also the same as previously described in relation to the first embodiment. Thus successive windings 48 are connected to the three-phase of the supply in the cyclic order: R, R, $\bar{Y}, \bar{Y}$, B, B, $\bar{R}, \bar{R}$, Y, Y, $\bar{B}, \bar{B}$, R etc. It will be seen that the currents in the winding conductors in each winding slot are equal and opposite to those in the winding conductors in the corresponding winding slot of the other lamination stack.

Figure 9:
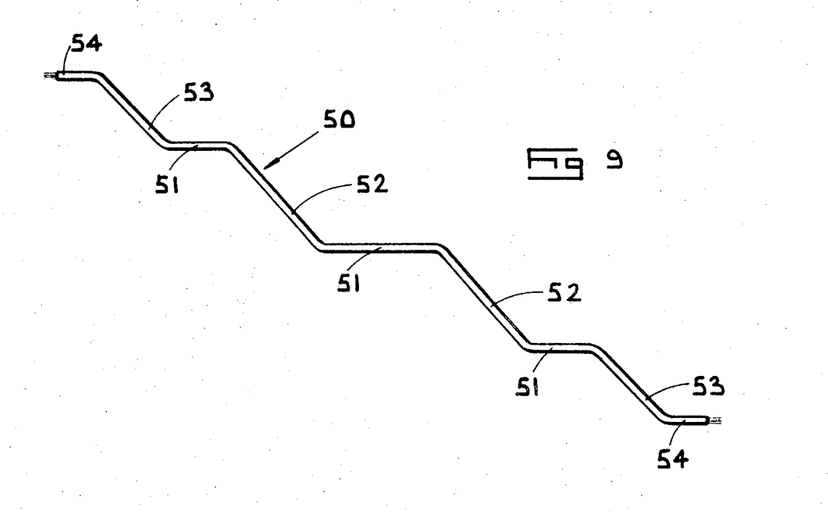

The arrangement of the fourth embodiment of the invention is evident from FIG. 9 which shows one of the generally planar winding conductors 50 from which the three-phase winding is formed by the procedure previously described. The fourth embodiment has the same magnetic structure and reaction member as the second embodiment and can be considered to be a wave-wound version of the second embodiment (FIGS. 5 and 6), being such as to provide two transverse low reluctance paths for working flux side-by-side across the width of the motor.

In FIG. 9 those parts of the winding conductor 50 which are received in the winding slots are indicated by the reference numeral 51, the crossover portions bridging the winding slots by the reference numeral 52, the inclined portions flanking the outer ones of the portions 51 by the reference numeral 53, and the conductor end portions by the reference numeral 54.

The offsetting of the portions 51 from one another is by five slot pitches, and the offsetting of each conductor end portion 54 from the neighbouring portion 51 is by three and a half slot pitches. Energisation of the winding formed from the conductors 50 is exactly as previously described, with the result that, like the second embodiment, laterally of the motor the outer lamination stacks produce travelling fields of magnetomotive force which are in antiphase with the field produced by the centre stack, so that working flux is driven around the side-by-side flux paths in the manner indicated in FIG. 5.

As in the previous embodiments, some working flux will pass longitudinally of the motor through flux paths separately provided in part by the stacks 26, 27 in their longitudinal direction.

Figure 10:
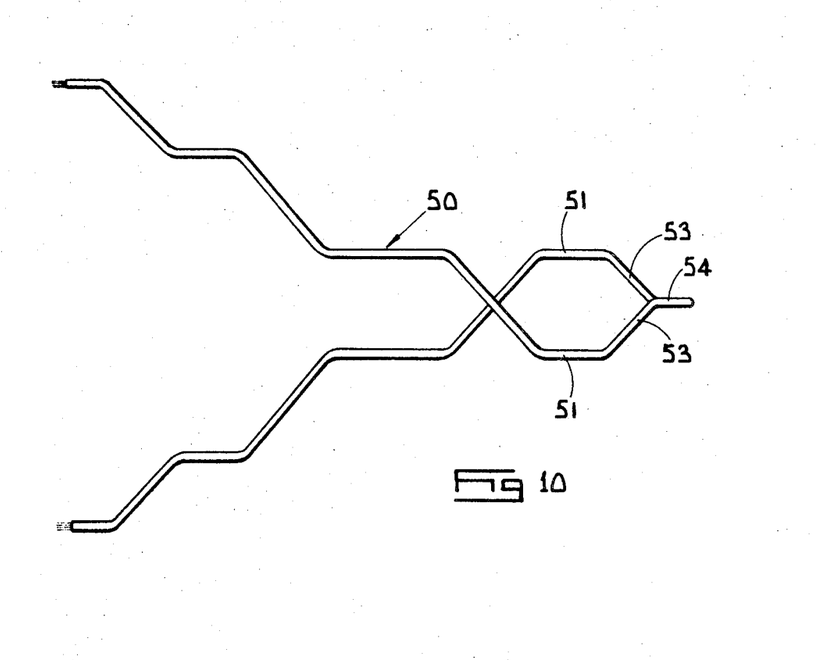
FIG. 10 shows a modification of the conductor of FIG. 9.

In a modification of the fourth embodiment, the portion 53 at the right hand end of each winding conductor 50 is inclined in the opposite direction to that shown and reduced in length so that the respective conductor end portion 54 is offset from the right hand portion 51 by two and a half slot pitches. The separate but overlapping windings forming the three-phase winding are then as shown in FIG. 10.

Figure 11:
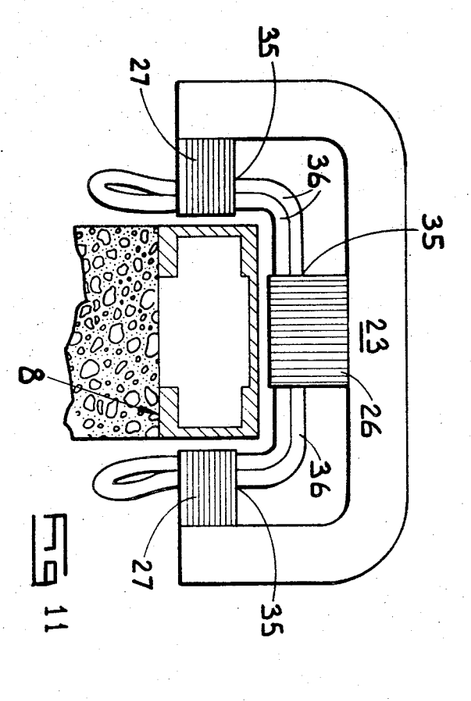
FIG. 11 is a cross-sectional end elevation showing the linear induction motor of FIGS. 5 and 6 in a modification.

Although the described embodiments of the invention have their windings formed of winding conductors which are generally planar for location in two or more laterally spaced but coplanar winding slots, this is not essential. For example, FIG. 11 shows a modification of the second embodiment in which the laminations 23 are generally U-shaped, so that transversely of the motor the primary member comprises two parallel arms with a central portion extending orthogonally therebetween. The outer lamination stacks 27 are carried at the inside faces of the arm ends so as to oppose one another; the central stack 26 is centrally carried by the central portion.

The reaction member 8 has a generally U-shaped configuration so as to correspond to the general configuration of the primary member. The secondary member thus has three orthogonal outer faces which, in use, oppose respective ones of the lamination stacks 26, 27.

The three-phase winding located in the winding slots on the faces of the stacks 26, 27 is formed of winding conductors which are bent through slightly more than 90 degrees at their crossover portions 36 and so are generally U-shaped in side elevation.

The method of assembling the three-phase winding from three conductors is essentially as previously described except that the portions 35 to be received in the winding slots of the outer stacks 27 are bent outwardly into position when the centre portions 35 have been located.

Although each of the described embodiments has each of its lamination stacks 3, 4, 26, 27 opposed by a corresponding part of the co-operating reaction member so that each stack has associated secondary member current paths, such an arrangement is not essential. In modifications of the first and third embodiments the reaction member opposes only one of the stacks 3 and 4, being stopped just short of the outer stack; likewise, in modifications of the second and fourth embodiments the reaction member opposes only the centre stack 26, stopping just short of the outer stacks 27 on either side. In each such modification the part or parts of the secondary member magnetic material directly opposing the respective stack 3, 4 or stacks 27 are made flush with the upper surface of the reaction member.

In a modification of each of the described embodiments the transverse laminations 7, 23 are provided only in correspondence with the core teeth 55, 56; they then form discrete, longitudinally spaced lamination stacks.

In a further modification the stacks of longitudinally orientated laminations are replaced by planar extensions of the transverse laminations. In an arrangement in accordance with the preceding paragraph the winding slots will then be provided by the gaps between adjacent stacks of transverse laminations. In an arrangement such as those shown in the drawings having its transverse laminations continuous along the motor, the winding slots may be formed either by the use of appropriately dimensioned laminations or after assembly by, for example, a milling operation. It will be appreciated that in such an arrangement substantially all the working flux will pass transversely, or substantially transversely, of the motor.

If desired the lamination stacks of the described embodiments may be individually replaced by one or more solid blocks of magnetic material; in addition, the parts of the longitudinal laminations or solid blocks bridging the winding slots may be of a sufficient depth not to saturate.

In each of the described embodiments the ends of the primary member part of each motor primary-secondary magnetic circuit are formed with core teeth separated longitudinally of the primary member by winding slots in which are received the winding conductors. In yet another possible modification, however, the core teeth are omitted, the lower faces of the stacks 3, 4 or 26, 27 being planar instead of castellated. The winding conductors are secured against these planar faces by suitable clamping devices and/or by thermosetting resin.

As previously described in relation to the first embodiment, in a primary member in accordance with the invention transverse current equality may exist either in the winding layers taken separately or as between winding layers. This is dependent, of course, upon the particular energisation of the component windings from a polyphase supply and upon the winding conductors and their interconnection.

The pole pitch of the travelling magnetic field produced by each lamination stack depends, of course, upon the winding energisation used, and may be varied as desired.

Although the described embodiments have an integral number of winding slots per pole per phase, a non-integral number may be used if desired. One non-illustrated embodiment of this kind has its energising winding formed of windings of the kind shown in FIG. 4 and having each loop spanning four slot pitches; for operation the windings are successively energised from the red (R), yellow (Y) and blue (B) phases of a three-phase supply in the order: R, $\bar{Y}$, B, B, $\bar{R}$, Y, Y, $\bar{B}$, R, R, Y, B, $\bar{R}$, Y, $\bar{B}$, $\bar{B}$, R etc.

Each of the described embodiments and modifications thereof is such that each of the two current in one winding slot is equal and opposite to a respective one of the currents in a transversely aligned winding slot of at least one other stack; thus the resultant travelling fields produced by the respective stacks are equal in magnitude and directly in antiphase transversely of the motor. It is not essential, however, that the resultant fields produced by the two stacks should be in exact antiphase and equal so that current equality transversely of the motor need not necessarily apply.

If desired a primary member in accordance with the invention may comprise two or more polyphase windings such as have been described, superimposed upon one another.

Although in the described embodiments the individual windings forming each energising winding each have only one turn, it will be appreciated that multiturn windings may be used. Thus in the first and second embodiments the pairs of conductors 13, 34 forming the individual lap windings may be connected together with their strands in series or series-parallel rather than in parallel as described.

The present invention provides a linear induction motor primary member having one or more polyphase energising windings which are two-layers and distributed and which, despite being arranged to generate at least two transversely spaced and generally anti-phase travelling fields of magnetomotive force, require the same number of winding connections to be made as if they were separately required to produce only one travelling field. Not only is the formation of the or each winding simplified, but also the absence of winding noses between the parts of the winding separately effective to create travelling magnetic fields tends to reduce the spacing required between those winding parts when disposed side-by-side. Thus the invention enables a single-sided linear induction motor having generally flat primary and secondary members to be made narrower than might otherwise be possible, this being of particular value where, as described the motor is used to propel a vehicle along a prepared track which includes the secondary member in generally horizontal disposition.

Figure 12:
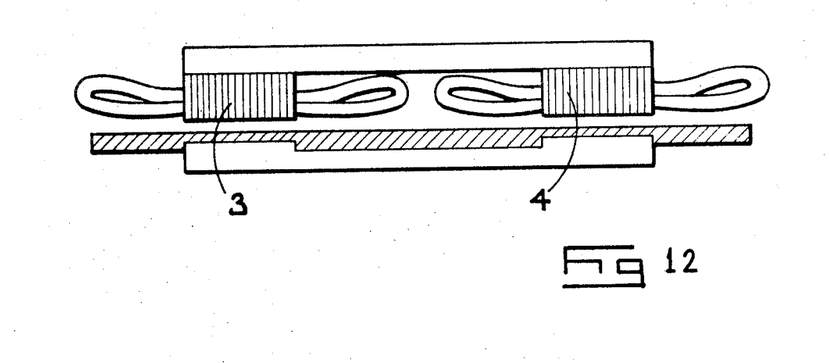
FIG. 12 is a similar view of the motor of FIG. 6 of the above-mentioned application Ser. No. 241,069, included for the purposes of comparison.

FIG. 12 is a view corresponding to FIG. 1 showing a primary member of the first embodiment with the stacks 3, 4 separately formed with three-phase windings of the conventional two-layer type, as is described with reference to FIG. 6 of the previously mentioned application Ser. No. 241,069. From a comparion of FIGS. 1 and 12 of the present application the above features can be clearly appreciated. Other features of the windings of the described embodiments of the present invention are the comparative ease with which the crossover portions can be secured against movement and the comparative ease of cooling.

The invention is not limited to single-sided linear induction motors as have particularly been described, but may also be applied to double-sided linear induction motors (in which the primary member has two parts disposed one on either side of the secondary member). Thus, in accordance with the present invention are double-sided primary members each comprising two of the primary members of a respective one of the described embodiments connected together in spaced relation. In operation each such double-sided primary member is arranged to straddle an electrically conductive, plate-like secondary member, and the energising windings of its two parts are energised in oppposed senses so that the corresponding lamination stacks 3 or 4, or 26 or 27 (as appropriate) generate magnetomotive forces which are additive and therefore combine to drive working flux through the interposed secondary member.

A further double-sided primary member in accordance with the invention is formed of the primary member of FIGS. 1 to 4 or FIGS. 7 and 8 when, as it were, bent into the shape of a hairpin (in cross-section) with the stacks 3, 4 opposing one another in parallel relation along their lengths.

As previously mentioned in relation to the first embodiment, the invention is not restricted to double-layer energising windings but includes within its scope linear induction motor primary members (and motors including such primary members) having one or more single-layer windings. In such an arrangement the offsetting of the two parts of each winding conductor associated with each primary-secondary magnetic circuit will be by substantially one pole pitch of the travelling magnetic field.

I claim:

1. A linear induction motor primary member having a magnetic core structure adapted for enabling working flux in operation to pass generally transversely of the motor around a primary-secondary magnetic circuit, wherein the core structure is terminated magnetically in the primary-secondary magnetic circuit at transversely spaced ends, the primary member having, for creating the said working flux, a polyphase energising winding comprising a plurality of winding conductors arranged in at least one winding layer, each winding conductor extending generally transversely of the motor in a respective winding layer and having a first part disposed adjacent one said end of the core structure for generating working flux therein and having a second part spaced from the first part and disposed adjacent the other said end of the core structure for generating working flux therein, and energising means for so energising the winding conductors from the phases of a polyphase A.C. supply that in operation the first and second parts of the winding conductors separately create fields of magnetomotive force which travel longitudinally of the primary member at the same speed as one another and which are at least sustantially in antiphase transversely of the primary member.

2. A primary member according to claim 1, wherein the winding conductors are arranged in two winding layers, the winding conductors of each winding layer having at least one of their ends connected to respective winding conductors of the other winding layer.

3. A primary member according to claim 1, wherein each said end of the magnetic core structure is formed with core teeth spaced longitudinally of the primary member with winding slots therebetween, the first and second parts of the winding conductors being received in said winding slots of respective ones of the said core structure ends.

4. A primary member according to claim 1, wherein the magnetic core structure is adapted for providing part of a single primary-secondary magnetic circuit across the width of the motor.

5. A primary member according to claim 4, wherein the magnetic core structure comprises two first magnetic structures extending longitudinally of the primary member in parallel spaced relationship and each providing one said end of the core structure, and a second magnetic structure extending between the first magnetic structure remote from the two said ends of the core structure so as magnetically to bridge the space between the two first structures.

6. A primary member according to claim 5, wherein each first magnetic structure comprises a plurality of magnetic laminations each orientated longitudinally of the primary member and disposed edge-on to the respective said end of the core structure, and the said second magnetic structure comprises a plurality of magnetic laminations each orientated transversely of the primary member.

7. A primary member according to claim 1, wherein the magnetic core structure is adapted for providing part of two primary-secondary magnetic circuits side-by-side across the width of the motor.

8. A primary member according to claim 1, wherein the individual windings and the energising means are so arranged and interconnected that in operation the first part of each winding conductor carries a current which is equal and opposite to the current in the second part of a respective winding conductor of the other winding layer, the said first part and the said second part being substantially aligned transversely of the primary member.

9. A primary member according to claim 1, wherein the winding conductors are identical, the winding conductors of the two winding layers being inverted as between the winding layers.

10. A linear induction motor having a primary member and a secondary member arranged transversely of one another for relative longitudinal movement therebetween, said primary member comprising a magnetic core structure and an energising winding associated therewith, said secondary member comprising electrically conductive material, said primary and secondary members being arranged in combination to provide a primary-secondary magnetic circuit for working flux created by said energising winding to pass generally transversely of the motor, said primary member core structure being terminated magnetically in the primary-secondary magnetic circuit at transversely spaced ends, the energising winding comprising a plurality of winding conductors arranged in at least one winding layer, each winding conductor extending generally transversely of the motor in a respective said winding layer and having a first part disposed adjacent one said end of the core structure for generating working flux therein and having a second part spaced from the first part and disposed adjacent the other said end of the core structure for generating working flux therein, and energising means for so energising the winding conductors from the phases of a polyphase A.C. supply that in operation the first and second parts of the conductors separately create fields of magnetomotive force which travel longitudinally of the primary member at the same speed as one another and which are at least substantially in antiphase transversely of the primary member.

11. A linear induction motor having a primary member and a secondary member arranged transversely of one another for relative longitudinal movement therebetween, said primary member comprising a magnetic core structure and an energising winding associated therewith, said secondary member compoising electrically conductive material, said primary and secondary members being arranged in combination to provide a primary-secondary magnetic circuit for working flux created by said energising winding to pass generally transversely of the motor, said primary member core structure being terminated magnetically in the primary-secondary magnetic circuit at transversely spaced ends, the energising winding comprising a plurality of winding conductors arranged in two winding layers, each winding conductor extending generally transversely of the motor in a respective said winding layer and having a first part disposed adjacent one said end of the core structure for generating working flux therein and having a second part spaced from the first part and disposed adjacent the other said end of the core structure for generating working flux therein, the winding conductors of one winding layer having at least one of their ends connected to respective winding conductors of the other winding layer, and energising means for so energising the winding conductors from the phases of a polyphase A.C. supply that in operation the first and second parts of the winding conductors separately create fields of magnetomotive force which travel longitudinally of the primary member at the same speed as one another and which are at least substantially in antiphase transversely of the primary member.

12. A linear induction motor primary member having a magnetic core structure adapted for enabling working flux in operation to pass generally transversely of the motor around a primary-secondary magnetic circuit, wherein the core structure is terminated magnetically in the primary-secondary magnetic circuit at transversely spaced ends, the primary member having, for creating the said working flux, a polyphase energising winding comprising a plurality of winding conductors arranged in two winding layers, each winding conductor extending generally transversely of the motor in a respective said winding layer and having a first part disposed adjacent one said end of the core structure for generating working flux therein and having a second part spaced from the first part and disposed adjacent the other said end of the core structure for generating working flux therein, the winding conductors of one winding layer having at least one of their ends connected to respective winding conductors of the other winding layer, and energising means for so energising the winding conductors from the phases of a polyphase A.C. supply that in operation the first and second parts of the conductors separately create fields of magnetomotive force which travel longitudinally of the primary member at the same speed as one another and which are at least substantially in antiphase transversely of the primary member.

* * * * *